US010214085B2

(12) United States Patent
Saka et al.

(10) Patent No.: US 10,214,085 B2
(45) Date of Patent: Feb. 26, 2019

(54) TRIM STRUCTURE OF VEHICLE

(71) Applicant: MAZDA MOTOR CORPORATION, Aki-gun, Hiroshima (JP)

(72) Inventors: Hirofumi Saka, Higashihiroshima (JP); Hiroki Ohira, Higashihiroshima (JP); Masanori Mochizuki, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/565,108

(22) PCT Filed: Oct. 17, 2016

(86) PCT No.: PCT/JP2016/080656
§ 371 (c)(1),
(2) Date: Oct. 6, 2017

(87) PCT Pub. No.: WO2017/073382
PCT Pub. Date: May 4, 2017

(65) Prior Publication Data
US 2018/0111463 A1    Apr. 26, 2018

(30) Foreign Application Priority Data
Oct. 29, 2015 (JP) .................................. 2015-213072

(51) Int. Cl.
*B60J 1/20* (2006.01)
*B60J 7/20* (2006.01)
(Continued)

(52) U.S. Cl.
CPC .................. *B60J 7/223* (2013.01); *B60J 1/17* (2013.01); *B60J 1/20* (2013.01); *B60J 5/0412* (2013.01);
(Continued)

(58) Field of Classification Search
CPC . B60J 1/1823; B60J 1/1884; B60J 1/20; B60J 1/2002; B60J 1/2005; B60J 1/2008;
(Continued)

(56) References Cited

U.S. PATENT DOCUMENTS

2001/0033089 A1* 10/2001 Maass .................... B60J 1/1823
296/107.07
2011/0000727 A1* 1/2011 Froeschle .............. B60J 1/2008
180/68.1
(Continued)

FOREIGN PATENT DOCUMENTS

JP           2006224907 A       8/2006

*Primary Examiner* — Gregory A Blankenship
(74) *Attorney, Agent, or Firm* — Alleman Hall Creasman & Tuttle LLP

(57) ABSTRACT

A trim structure of a vehicle includes a deck cover constituting a vehicle interior upper portion at a vehicle rear side. The trim structure is provided between a seat and the deck cover and at an upper end of a door main body. The deck cover includes: left and right cover side portions opposed to each other; a rear window opening opening at a vehicle rear side of the seat; and a rear window configured to be openable and closable. The trim structure includes a straightening trim body located between a lower portion of a front end of one of the cover side portions and the seat and projecting to the upper end of the door main body. The straightening trim body is formed so as to straighten traveling wind to the rear window opening in an open state, the traveling wind flowing into a vehicle interior.

16 Claims, 9 Drawing Sheets

(51) Int. Cl.
  *B60R 13/02* (2006.01)
  *B62D 35/00* (2006.01)
  *B60J 7/22* (2006.01)
  *B60J 1/17* (2006.01)
  *B60J 5/04* (2006.01)

(52) U.S. Cl.
  CPC ............... *B60J 7/22* (2013.01); *B60R 13/02* (2013.01); *B62D 35/008* (2013.01); *B60Y 2306/09* (2013.01)

(58) Field of Classification Search
  CPC ........... B60J 7/22; B60J 7/223; B62D 35/008; B60Y 2306/09; B60R 13/025
  See application file for complete search history.

(56) References Cited

U.S. PATENT DOCUMENTS

| | | | |
|---|---|---|---|
| 2011/0001329 A1* | 1/2011 | Froeschle | B60J 1/2008 296/76 |
| 2013/0033067 A1* | 2/2013 | Ugolini | B60J 7/146 296/146.14 |
| 2016/0185310 A1* | 6/2016 | Tanahashi | B60J 10/72 361/217 |
| 2018/0111463 A1* | 4/2018 | Saka | B60J 7/22 |
| 2018/0297451 A1* | 10/2018 | Banner | B60J 1/2002 |

\* cited by examiner

TRIM STRUCTURE OF VEHICLE

TECHNICAL FIELD

The present invention relates to a trim structure of a vehicle, the trim structure being configured to straighten traveling wind by a trim member, the traveling wind flowing through a vehicle lateral side into a vehicle interior of, for example, a convertible including an openable roof that is openable and closable.

BACKGROUND ART

Regarding a vehicle including an openable roof that is openable and closable and located at an upper portion of a vehicle interior portion into which an occupant(s) gets, that is, regarding a so-called convertible, when the openable roof is closed (closed state), traveling wind from a vehicle front side flows along a vehicle body surface toward a vehicle rear side.

In contrast, when the openable roof is open (open state), the traveling wind hardly stably flows toward the vehicle rear side by an opening of an upper portion of the vehicle, and pressure in the vehicle interior becomes negative relative to an outside of the vehicle. Therefore, the flow of the traveling wind flowing through the upper portion of the vehicle tends to change more than when the openable roof is in the closed state.

For example, it is known that when the openable roof is in the open state, a part of the traveling wind flowing through a front window to a vehicle rear side of seats is deflected by the negative pressure in the vehicle interior so as to turn toward the vehicle front side.

Therefore, when the openable roof is in the open state, unpleasant feelings may be given to the occupant(s) by exposure to wind and noise generated by the exposure to wind, the exposure to wind denoting that the traveling wind having turned and flowed from the vehicle rear side into the vehicle interior hits the occupant(s).

On this account, various technologies have been proposed to suppress the exposure to wind in the open state of the openable roof and the noise generated by the exposure to wind.

For example, in PTL 1, to straighten turning wind turning and flowing from the vehicle rear side of the seats into the vehicle interior when the openable roof is in the open state, a window deflector device is provided between a pair of left and right seats and at the vehicle rear side. With this, PTL 1 can suppress the flow of the turning wind into the vehicle interior, and therefore, suppresses the exposure to wind in the open state of the openable roof and the noise generated by the exposure to wind.

As the traveling wind flowing into the vehicle interior, in addition to the turning wind flowing from the vehicle rear side, there is traveling wind flowing into the vehicle interior from a vehicle side portion opening formed by lowering door glass.

In the case of a vehicle, such as a targa top, configured such that only a roof portion located above a head of the occupant(s) opens and closes, an upper portion of the vehicle interior which portion is located at a vehicle rear side of the door glass is covered with a side wall and the like. Therefore, when the door glass is lowered, the traveling wind flows from the vehicle side portion opening through a space between the seat and the side wall into a rear side of the vehicle interior.

This may cause, for example, the exposure to wind caused such that the traveling wind having collided with a pillar portion flows toward the occupant(s), the noise generated by the traveling wind colliding with the pillar portion, and the noise generated by the exposure to wind. Further, the traveling wind having flowed to the vehicle rear side of the seats hardly flows to the outside of the vehicle. Therefore, unintended noise may be generated at the vehicle rear side of the seats, and this may become a factor that gives unpleasant feelings to the occupant(s).

CITATION LIST

Patent Literature

PTL 1: Japanese Laid-Open Patent Application Publication No. 2006-224907

SUMMARY OF INVENTION

Technical Problem

The present invention was made to solve the above problems, and an object of the present invention is to provide a trim structure of a vehicle, the trim structure being able to straighten traveling wind flowing through a vehicle lateral side into a vehicle interior and reduce unpleasant feelings given to an occupant(s) by the traveling wind.

Solution to Problem

The present invention is a trim structure of a vehicle, the trim structure including: a door including a door main body supported so as to be openable and closable relative to a side portion of a vehicle body of the vehicle and a door glass supported by the door main body so as to be vertically movable; and a rear roof constituting a vehicle interior upper portion located at a vehicle upper side of an upper end of the door main body and a vehicle rear side of the door main body, wherein: the trim structure is provided between a seat located adjacent to the door main body and the rear roof and at the vehicle upper side of the upper end of the door main body; the rear roof includes a pair of left and right upper side portions opposed to each other in a vehicle width direction, a rear opening portion located at a vehicle rear side of the seat and opening in a vehicle forward/rearward direction, and a closing member configured to close the rear opening portion and be openable and closable; the trim structure includes a straightening trim located between a lower portion of a front end of one of the upper side portions and the seat and projecting to the vehicle upper side of the upper end of the door main body; and the straightening trim is formed in such a shape as to straighten traveling wind to the rear opening portion in an open state, the traveling wind flowing through a vehicle lateral side into a vehicle interior with the door glass lowered.

Examples of the rear roof include: a roof fixed to the vehicle body; and a roof supported by the vehicle body so as to be openable and closable.

Examples of the upper side portion include: a side portion located at the vehicle rear side of door glass of a targa top vehicle; a side portion constituted by a substantially columnar pillar portion; and a side portion constituted by a substantially columnar pillar portion, door glass at the vehicle rear side, and the like.

Examples of the rear opening portion include: an opening formed by opening a rear window that is openable and closable; a slit-shaped opening located adjacent to the rear window; and an opening formed by opening a roof member that is openable and closable and covers a vehicle interior upper portion extending from an upper end of a front window to a trunk lid.

Examples of the straightening trim include: a trim member formed separately from a trim covering a portion of the vehicle body which portion is located close to a rear end of a door main body; and a trim formed integrally with the trim covering the portion of the vehicle body which portion is located close to the rear end of the door main body.

The present invention can straighten the traveling wind flowing through the vehicle lateral side into the vehicle interior and reduce unpleasant feelings given to the occupant(s) by the traveling wind.

Specifically, when the vehicle travels with the door glass lowered, pressure in the vehicle interior becomes negative pressure. Therefore, the traveling wind flows into the vehicle interior through the opening formed by lowering the door glass at the vehicle lateral side and further flows through a space between the upper side portion and the seat, that is, flows through the vicinity of the head of the occupant to the vehicle rear side.

Since the trim structure of the vehicle includes the straightening trim between the upper side portion and the seat, the trim structure of the vehicle can straighten the traveling wind, flowing inside through the opening at the vehicle lateral side, to guide the traveling wind to the vehicle rear side.

With this, the trim structure of the vehicle can prevent a case where the traveling wind flowing inside through the opening at the vehicle lateral side flows toward the head of the occupant. Therefore, the trim structure of the vehicle can suppress exposure to wind, that is, prevent the traveling wind from hitting the occupant. Further, the trim structure of the vehicle can realize that noise generated by the flow of the traveling wind flowing through the vicinity of the head of the occupant is hardly transmitted to the occupant.

Further, since the trim structure of the vehicle includes the rear opening portion located at the vehicle rear side of the seat, the trim structure of the vehicle can smoothly discharge the traveling wind, straightened by the straightening trim, through the rear opening portion in the open state toward the vehicle rear side to the outside of the vehicle.

With this, the trim structure of the vehicle can suppress the generation of the air turbulence by the traveling wind at the vehicle rear side of the seat and the generation of the noise by the air turbulence. To be specific, the trim structure of the vehicle positively and efficiently discharges the traveling wind, flowing through the opening at the vehicle lateral side into the vehicle interior, through the rear opening portion to the outside of the vehicle. Thus, the trim structure of the vehicle can reduce factors that give the unpleasant feelings to the occupant(s).

Therefore, by the straightening trim and the rear opening portion, the trim structure of the vehicle can straighten the traveling wind flowing through the vehicle lateral side into the vehicle interior and reduce the unpleasant feelings given to the occupant(s) by the traveling wind.

As one aspect of the present invention, the trim structure may further include a projecting portion including: a lower portion coupled to a portion of the vehicle body which portion is located close to a rear end of the door main body; and an upper portion projecting to the vehicle upper side of the upper end of the door main body, wherein an upper portion of the straightening trim may be coupled to the projecting portion.

Examples of the projecting portion include: a member formed separately from the vehicle body; and a member formed integrally with the vehicle body.

According to the present invention, the trim structure of the vehicle can more stably straighten the traveling wind flowing through the vehicle lateral side into the vehicle interior and further reduce the factors that give the unpleasant feelings to the occupant(s).

Specifically, for example, when the straightening trim is formed integrally so as to be supported by a trim member provided at the vehicle body, rigidity of the straightening trim tends to be low, so that the straightening trim tends to swing by pressure of the traveling wind flowing inside through the opening at the vehicle lateral side. Therefore, the straightening trim cannot stably straighten the traveling wind, flowing inside through the opening at the vehicle lateral side, toward the rear opening portion and may cause the traveling wind to flow toward the head of the occupant.

However, since the straightening trim is coupled to the upper portion of the projecting portion coupled to the vehicle body, the trim structure of the vehicle can improve supporting rigidity of the straightening trim.

With this, the rigidity of the straightening trim of the trim structure of the vehicle can be made higher than the rigidity of, for example, the straightening trim supported by a trim member provided at the vehicle body, and the trim structure of the vehicle can suppress the swinging of the straightening trim by the pressure of the traveling wind.

Therefore, the trim structure of the vehicle can more stably suppress a case where the traveling wind flowing inside through the opening at the vehicle lateral side flows toward the head of the occupant.

Further, since the swinging of the straightening trim by the pressure of the wind can be suppressed, the trim structure of the vehicle can suppress the generation of the noise by the swinging of the straightening trim when the traveling wind is straightened by the straightening trim.

Therefore, since the straightening trim is coupled to the projecting portion provided at the vehicle body, the trim structure of the vehicle can more stably guide the traveling wind, flowing through the vehicle lateral side into the vehicle interior, toward the rear opening portion and further reduce the factors that give the unpleasant feelings to the occupant(s).

As another aspect of the present invention, the trim structure may be configured such that: each of the pair of left and right upper side portions is formed in a shape having a predetermined length in the vehicle forward/rearward direction; and the rear roof includes an upper coupling portion coupling upper portions of the upper side portions to each other in the vehicle width direction and a lower coupling portion coupling lower portions of the upper side portions to each other in the vehicle width direction.

According to the present invention, even when the rear roof is configured such that the traveling wind is hardly discharged to the outside of the vehicle through a portion other than the rear opening portion, the trim structure of the vehicle can reduce, by the straightening trim, the factors that give the unpleasant feelings to the occupant(s).

Specifically, since the rear roof is constituted by the pair of left and right upper side portions, the upper coupling portion, and the lower coupling portion, the rear roof can cover a portion between the seat and the rear opening portion while securing a predetermined space.

In a case where the straightening trim is not included, a part of the traveling wind flowing inside the rear roof may flow so as to drift inside the rear roof, and this may cause the air turbulence.

However, since the straightening trim is included, the traveling wind flowing inside through the opening at the vehicle lateral side can be guided to the rear opening portion. Therefore, even in a case where the rear roof covers a portion between the seat and the rear opening portion, the trim structure of the vehicle can suppress the flow rate and flow velocity of the traveling wind flowing inside the rear roof. With this, the trim structure of the vehicle can suppress the generation of the air turbulence by the traveling wind flowing inside the rear roof and the generation of the noise by the air turbulence.

Further, even when the rear roof is configured such that the traveling wind is hardly discharged to the outside of the vehicle through a portion other than the rear opening portion, the trim structure of the vehicle can straighten the traveling wind flowing inside through the opening at the vehicle lateral side. Therefore, according to the trim structure of the vehicle, the rear roofs of various shapes can be configured, and the design of the vehicle can be improved.

Therefore, even when the rear roof is configured such that the traveling wind is hardly discharged to the outside of the vehicle through a portion other than the rear opening portion, the trim structure of the vehicle can reduce, by the straightening trim, the factors that give the unpleasant feelings to the occupant(s).

As yet another aspect of the present invention, the trim structure may be configured such that: the closing member is constituted by a rear window configured to close the rear opening portion and be openable and closable; the trim structure includes a storage compartment storing at least the rear window, the storage compartment being located at a portion of the vehicle body which portion is located at a vehicle lower side of the rear roof; the rear roof is configured to be supported by the vehicle body and cover the storage compartment so as to be openable and closable; and the straightening trim is provided at the vehicle body.

According to the present invention, for example, even when the rear window is opened or closed during traveling at low speed, the trim structure of the vehicle can surely straighten the traveling wind flowing through the vehicle lateral side into the vehicle interior and can stably reduce the factors that give the unpleasant feelings to the occupant(s).

Specifically, the trim structure of the vehicle includes the straightening trim at the vehicle body, so that even in a case where, for example, the rear roof moves upward relative to the vehicle body to open or close the rear window during traveling at low speed, the trim structure of the vehicle can straighten the traveling wind flowing inside through the opening at the vehicle lateral side.

Further, for example, the straightening trim is coupled to the projecting portion projecting to the vehicle upper side of the upper end of the door main body and supported by the vehicle body, so that even when the turbulence of the flow of the traveling wind is generated by the rear roof that moves upward and downward, the trim structure of the vehicle can surely straighten the traveling wind by the straightening trim having high supporting rigidity.

Therefore, for example, even when the rear window is opened or closed during traveling at low speed, the trim structure of the vehicle can surely straighten the traveling wind flowing through the vehicle lateral side into the vehicle interior and can stably reduce the factors that give the unpleasant feelings to the occupant(s).

As still another aspect of the present invention, the trim structure may further include a predetermined auxiliary device including: a lower portion coupled to a portion of the vehicle body which portion is located close to a rear end of the door main body; and an upper portion arranged so as to project to the vehicle upper side of the upper end of the door main body, wherein the straightening trim may be formed in such a shape as to cover the predetermined auxiliary device.

Examples of the predetermined auxiliary device include: an opening/closing mechanism portion configured to open and close a rear window that is openable and closable; and an opening/closing mechanism portion configured to integrally open and close a roof and a rear window which are openable and closable.

According to the present invention, the trim structure of the vehicle can effectively utilize a limited space in the vehicle interior and suppress the generation of the noise by collision of the traveling wind with the predetermined auxiliary device.

Specifically, the predetermined auxiliary device can be arranged so as to project to the vehicle upper side of the upper end of the door main body. Therefore, the trim structure of the vehicle can improve the degree of freedom of the layout of the predetermined auxiliary device as compared to a case where the predetermined auxiliary device is arranged at the vehicle body so as not to project to the vehicle upper side of the upper end of the door main body.

Further, since the straightening trim covers the predetermined auxiliary device, the trim structure of the vehicle can suppress the generation of the noise by the collision of the traveling wind, flowing inside through the opening at the vehicle lateral side, with the predetermined auxiliary device and the generation of the air turbulence.

Therefore, since the straightening trim covers the predetermined auxiliary device arranged so as to project to the vehicle upper side of the upper end of the door main body, the trim structure of the vehicle can effectively utilize a limited space in the vehicle interior and can suppress the generation of the noise by the collision of the traveling wind with the predetermined auxiliary device.

Advantageous Effects of Invention

The present invention can provide a trim structure of a vehicle, the trim structure being capable of straightening traveling wind flowing through a vehicle lateral side into a vehicle interior and reducing unpleasant feelings given to an occupant(s) by the traveling wind.

DESCRIPTION OF EMBODIMENTS

One embodiment of the present invention will be explained in reference to the drawings.

A vehicle 1 of the present embodiment will be specifically explained based on FIGS. 1 to 9.

Figure 1:
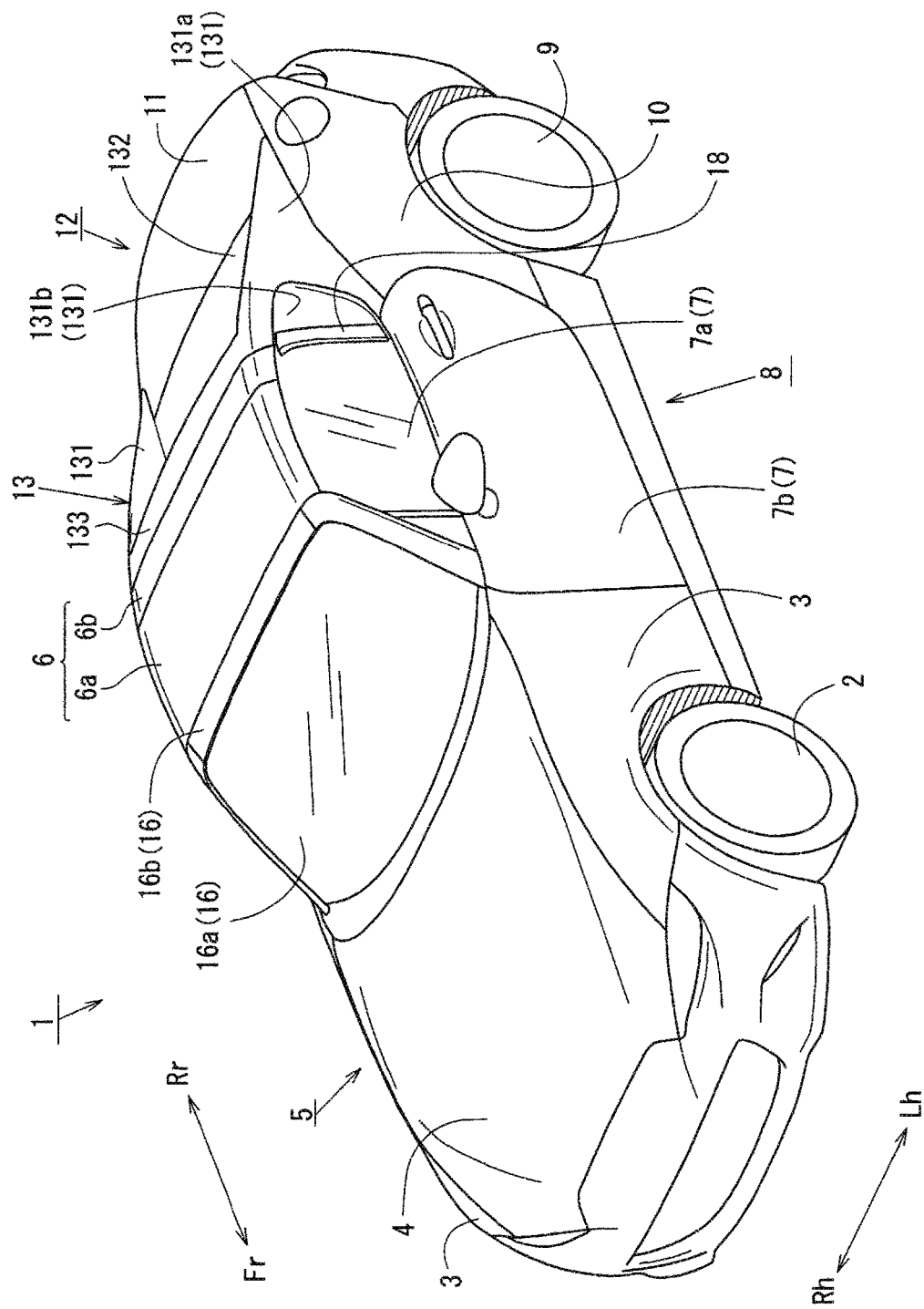
FIG. 1 is an appearance perspective view showing an appearance of a vehicle when an openable roof is in a closed state.
Figure 2:
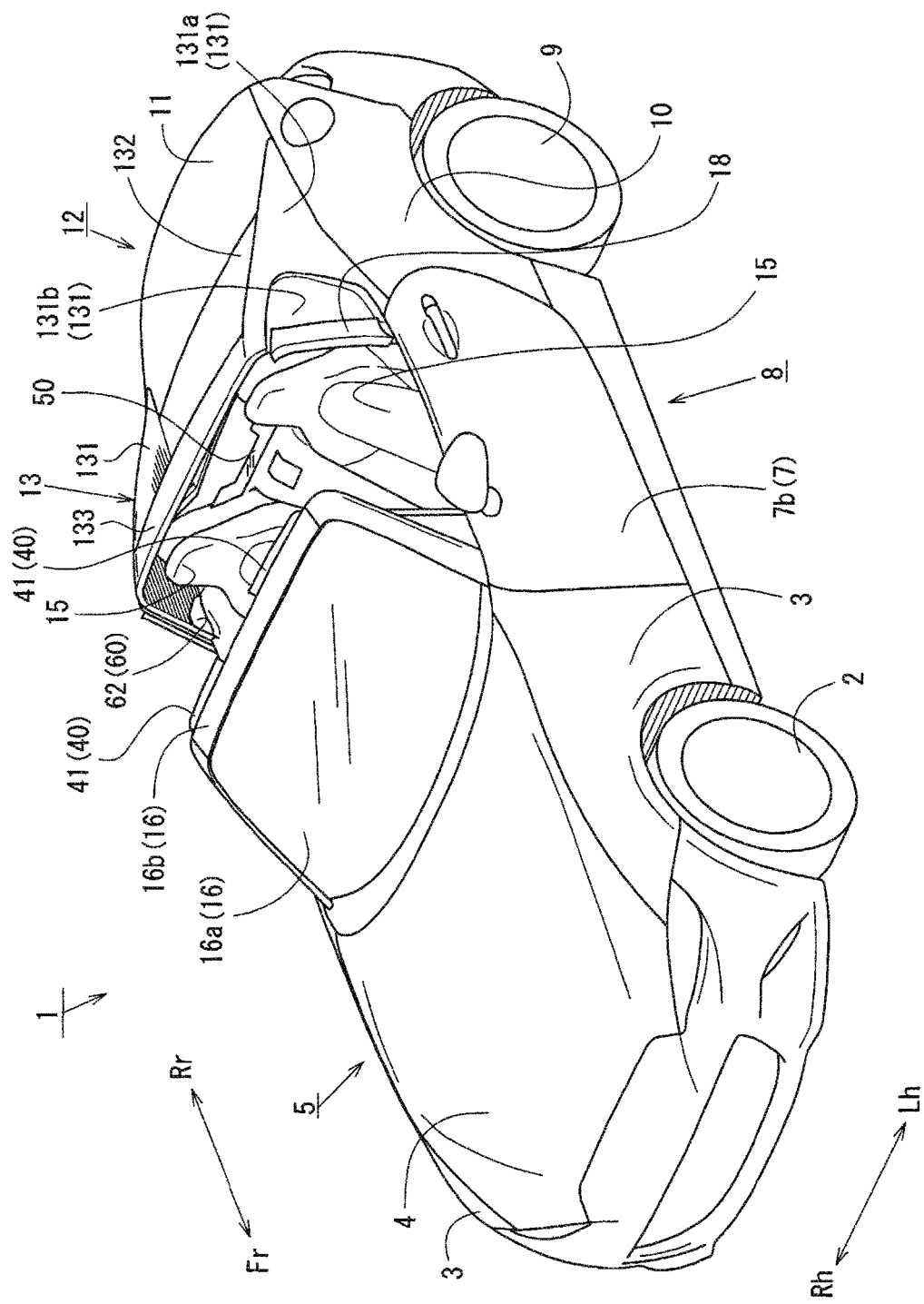
FIG. 2 is an appearance perspective view showing an appearance of the vehicle when the openable roof is in an open state.
Figure 3:
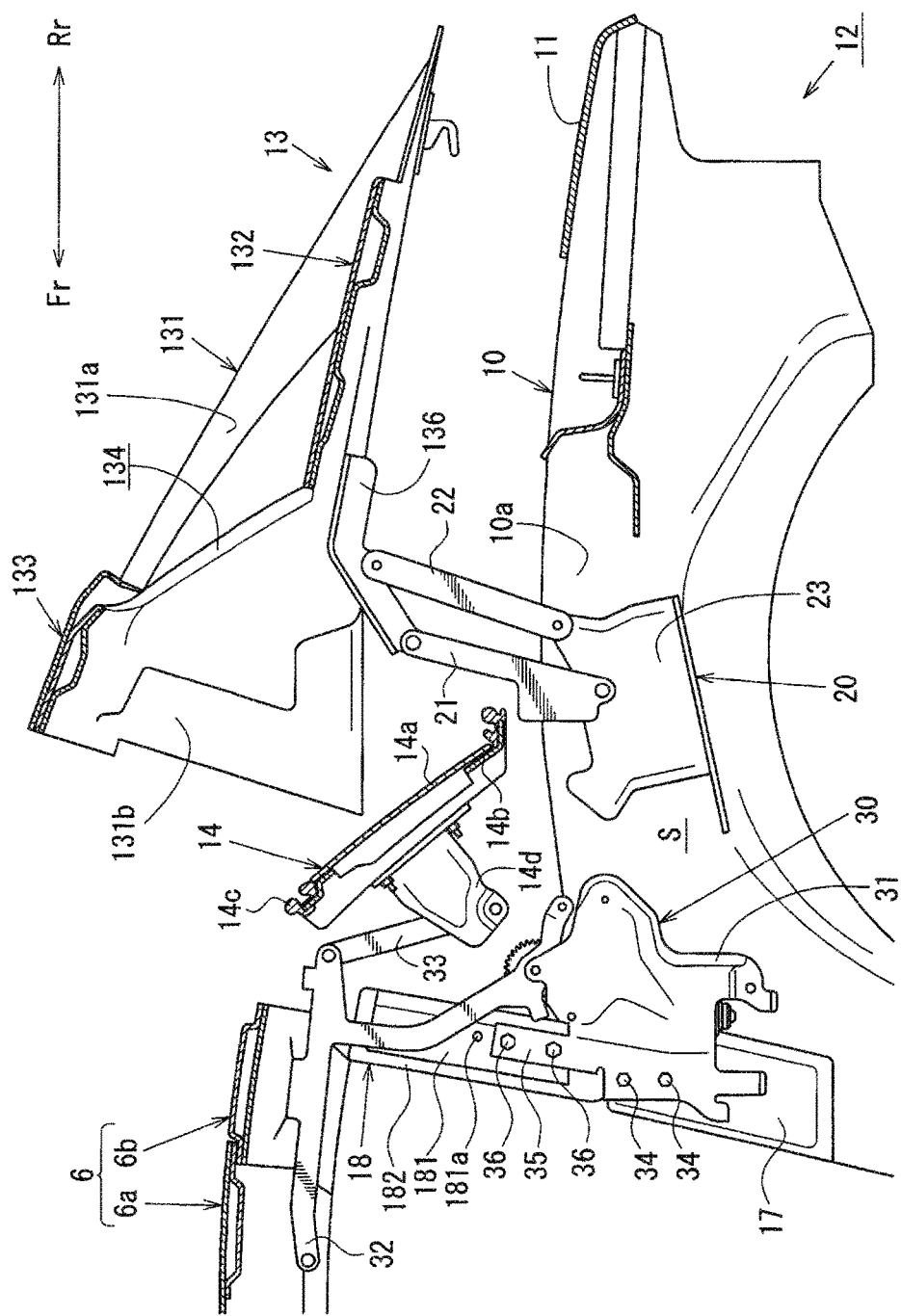
FIG. 3 is a side view showing an opening/closing mechanism when a deck cover is in an open state, when viewed from an inside of the vehicle.
Figure 4:
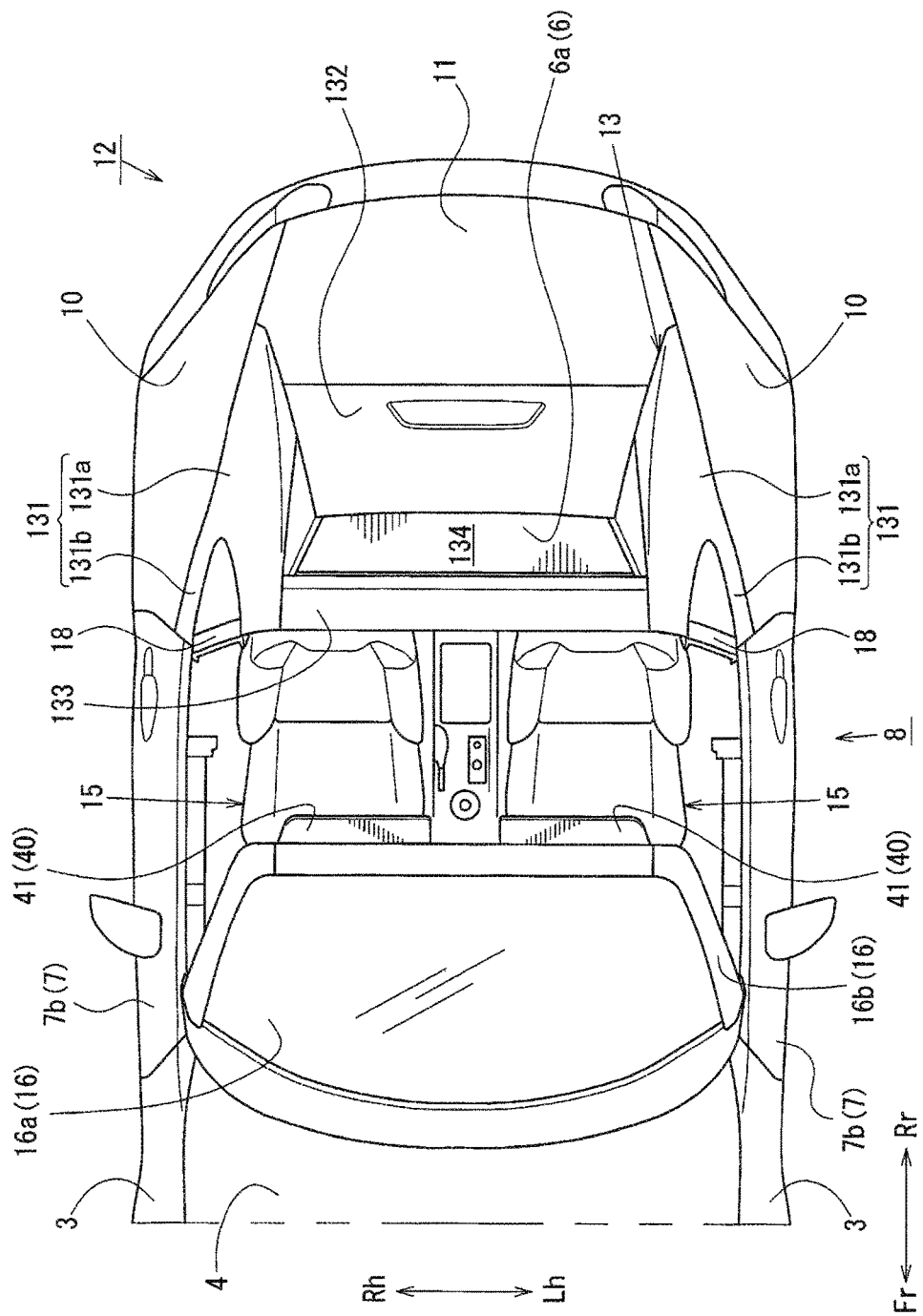
FIG. 4 is a plan view showing an appearance of the vehicle when the openable roof is in the open state.

FIG. 1 is an appearance perspective view of the vehicle 1 when an openable roof 6 is in a closed state. FIG. 2 is an appearance perspective view of the vehicle 1 when the openable roof 6 is in an open state. FIG. 3 is a side view showing an opening/closing mechanism when a deck cover 13 is in an open state, when viewed from an inside of the vehicle. FIG. 4 is a plan view showing the vehicle 1 when the openable roof 6 is in the open state.

Figure 5:
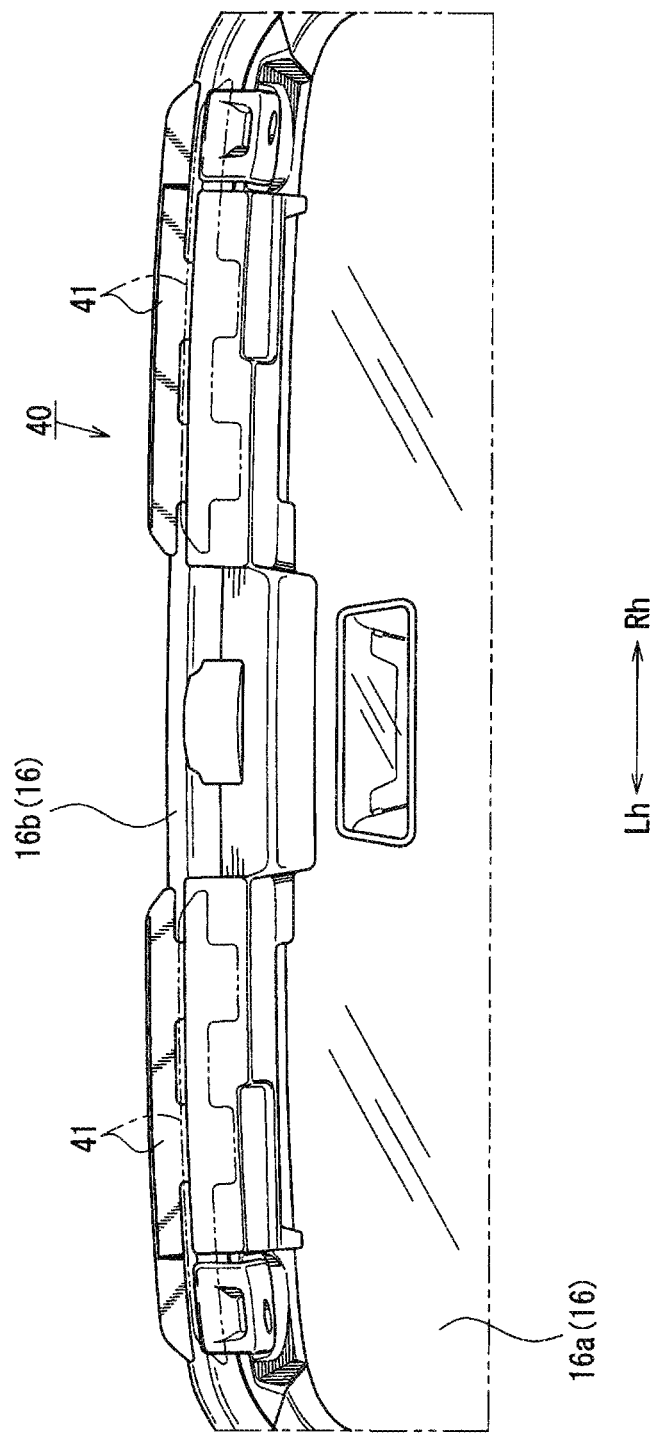
FIG. 5 is a rear view showing an appearance of front deflector devices when viewed from an inside of a vehicle interior.
Figure 6:
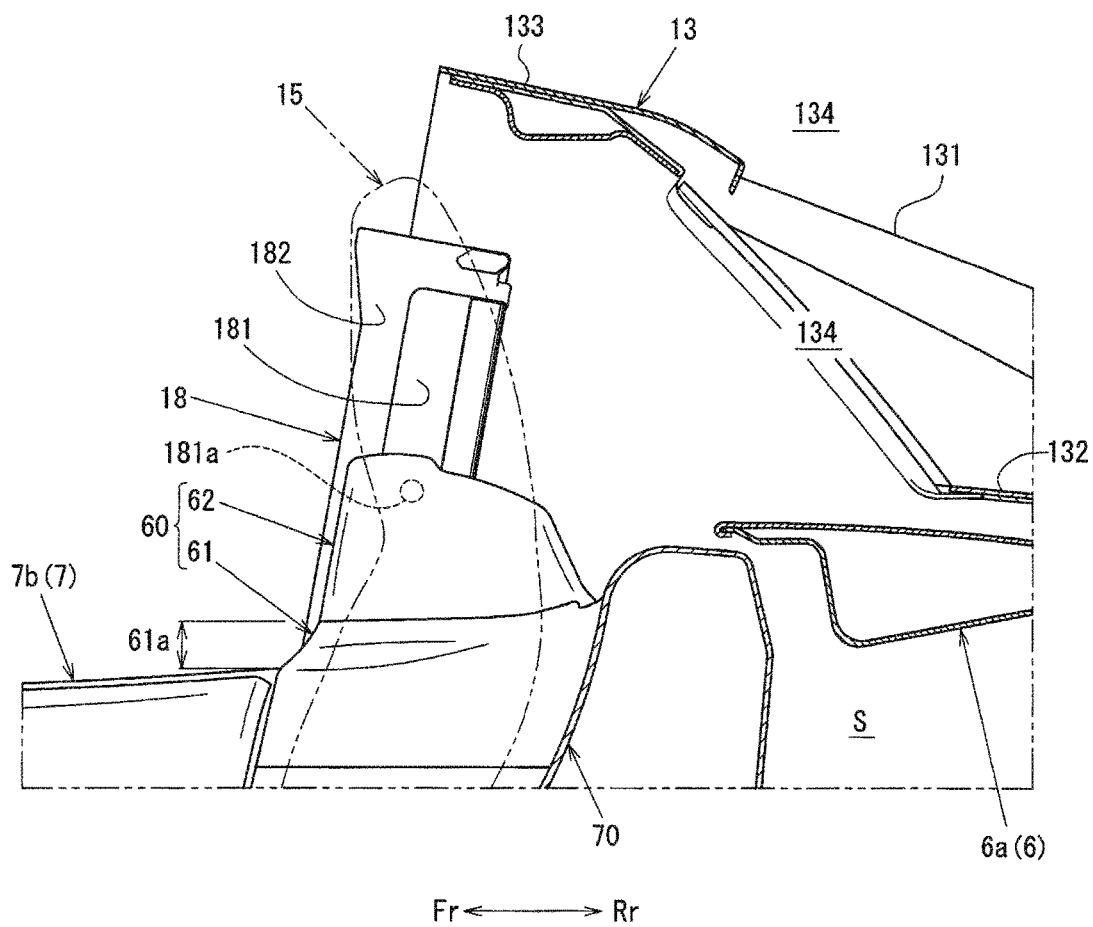
FIG. 6 is a side view showing a side-surface trim and a projecting trim.
Figure 7:
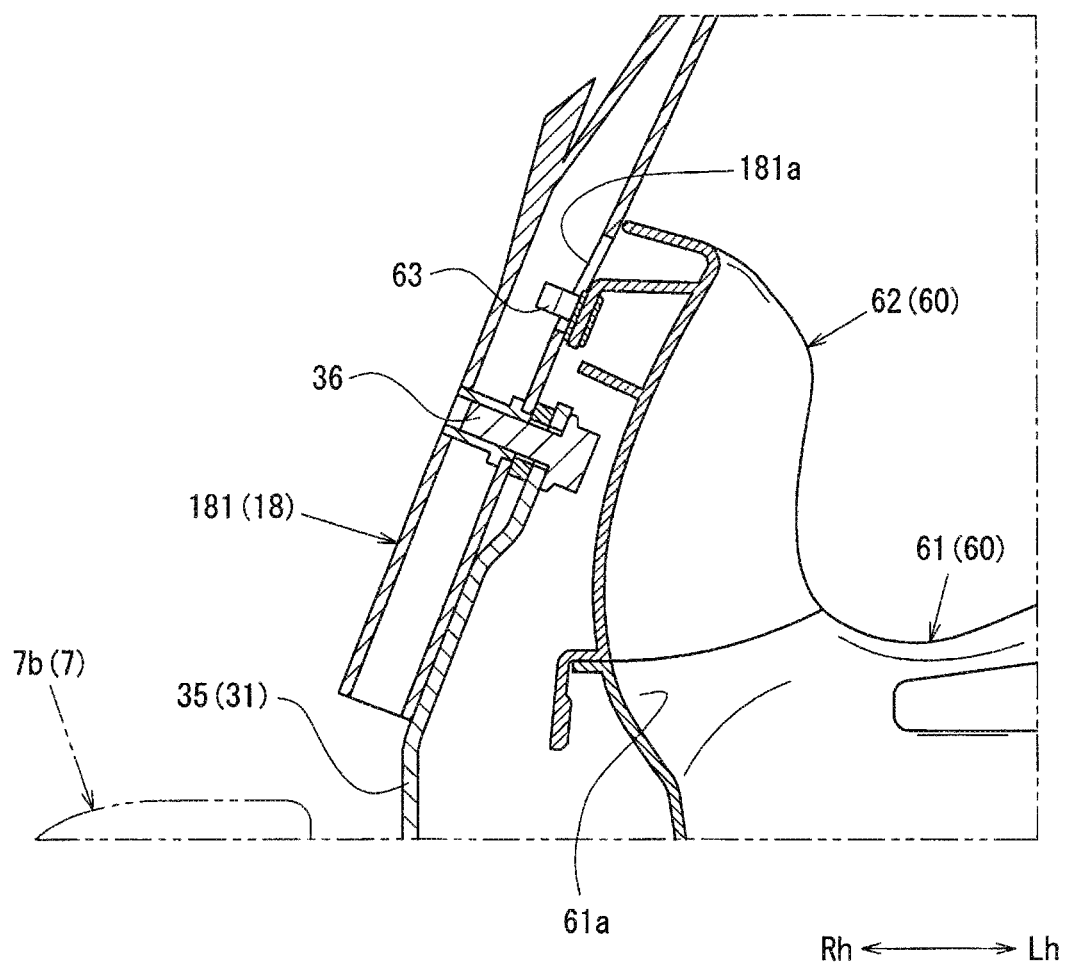
FIG. 7 is a major component sectional view showing sectional shapes of major components in a substantially vertical section along a vehicle width direction.
Figure 8:
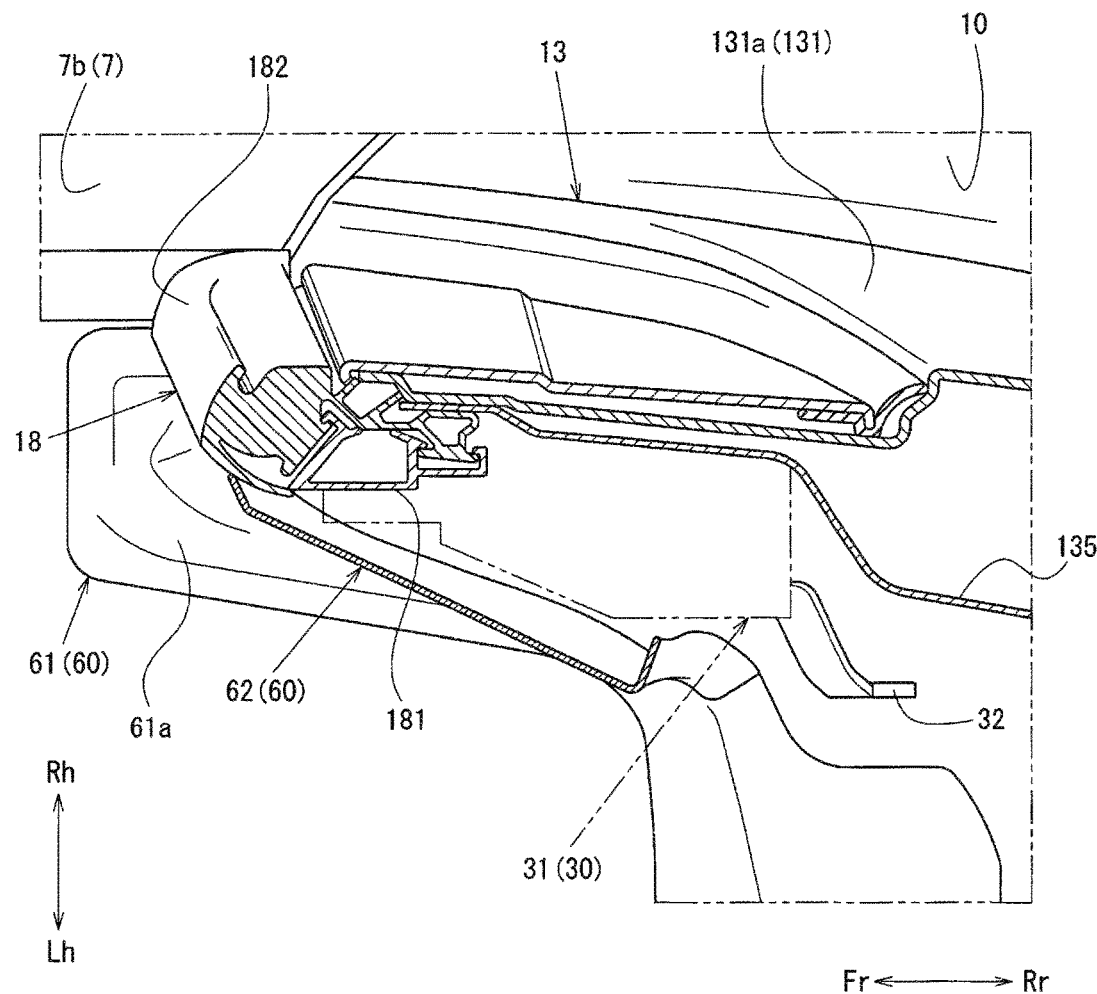
FIG. 8 is a major component sectional view showing sectional shapes of major components in a substantially horizontal section.
Figure 9:
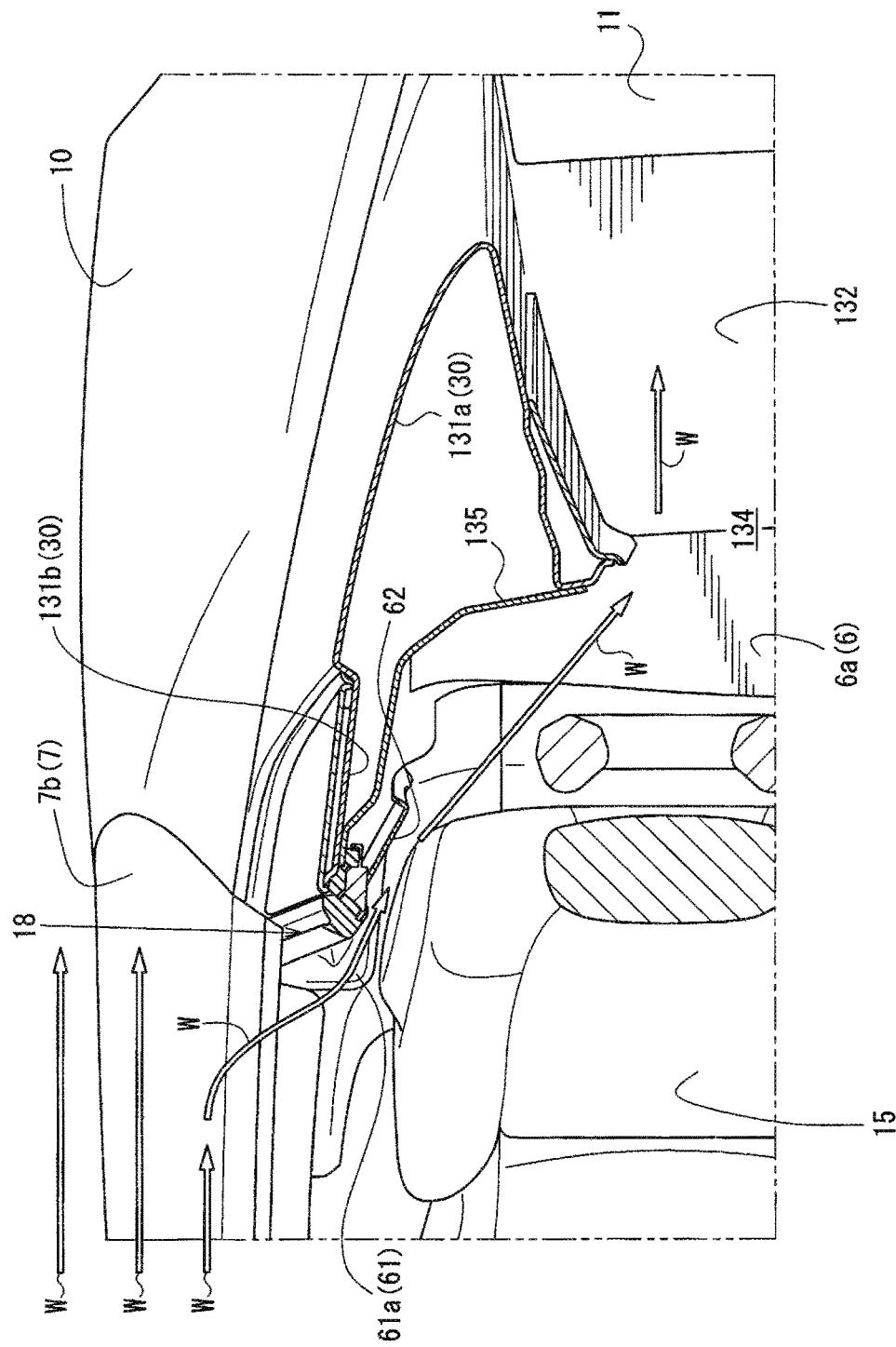
FIG. 9 is an explanatory diagram for explaining flow of traveling wind in a substantially horizontal section.

FIG. 5 is a rear view showing an appearance of front deflector devices 40 when viewed from an inside of a vehicle interior. FIG. 6 is a side view showing a side-surface trim 61 and a projecting trim 62. FIG. 7 is a major component sectional view showing major components in a substantially vertical section along a vehicle width direction. FIG. 8 is a major component sectional view showing major components in a substantially horizontal section. FIG. 9 is an explanatory diagram for explaining flow of traveling wind W in a substantially horizontal section.

Further, to clearly show the major components, a roof opening/closing mechanism 30 is shown by a two-dot chain line in FIG. 8, and the projecting trim 62 is shown in FIG. 9 by a section taken at a position different from a cutting-plane position of the deck cover 13.

In the drawings, arrows Fr and Rr indicate a vehicle forward/rearward direction. The arrow Fr indicates a vehicle front side, and the arrow Rr indicates a vehicle rear side. Further, arrows Rh and Lh indicate a vehicle width direction. The arrow Rh indicates a vehicle rightward direction, and the arrow Lh indicates a vehicle leftward direction. In addition, an upper side in FIG. 1 corresponds to a vehicle upper side, and a lower side in FIG. 1 corresponds to a vehicle lower side.

First, as shown in FIG. 1, the vehicle 1 of the present embodiment includes a vehicle front portion 5, a vehicle interior portion 8, and a vehicle rear portion 12, which are arranged in this order from the vehicle front side. The vehicle front portion 5 includes a pair of left and right front wheels 2, a pair of left and right front fenders 3, a hood 4, and the like. The vehicle interior portion 8 includes the openable roof 6 located at a vehicle upper portion, a pair of left and right doors 7, and the like, and an occupant(s) gets into the vehicle interior portion 8. The vehicle rear portion 12 includes a pair of left and right rear wheels 9, a pair of left and right rear fenders 10, and a trunk lid 11.

Further, as shown in FIGS. 2 and 3, the vehicle rear portion 12 includes a storage portion (not shown) constituted by: a storage compartment S which is located at a vehicle front side of a portion between the left and right rear fenders 10 and whose vehicle upper side is open; and the deck cover 13 configured to close the opening of the storage compartment S.

As shown in FIGS. 1 to 3, the vehicle 1 is a so-called convertible configured such that: the openable roof 6 can be divided and folded to be stored in the storage compartment S that is opened by the movement of the deck cover 13 toward a vehicle upper rear side; and a rear window 14 can be stored in conjunction with the operation of storing the openable roof 6.

More specifically, the storage compartment S is configured to have such a size as to include an internal space that can accommodate the folded openable roof 6 and the rear window 14.

As shown in FIGS. 2 to 4, the deck cover 13 covering the opening of the storage compartment S constitutes a portion which is located at the vehicle upper side of the doors 7 of the vehicle interior portion 8 and at the vehicle rear side of rear ends of the doors 7.

The deck cover 13 includes: a pair of left and right cover side portions 131 opposed to each other in the vehicle width direction; a cover base portion 132 coupling lower portions of the cover side portions 131 to each other; and a cover header portion 133 coupling upper portions of the cover side portions 131 to each other.

Further, the deck cover 13 includes a rear window opening 134 which is formed by the left and right the cover side portions 131, the cover base portion 132, and the cover header portion 133 and to which the rear window 14 is detachably attached.

The left (right) cover side portion 131 integrally includes: a left (right) protruding portion 131a located at the vehicle rear side and protruding to the vehicle upper side to have a substantially mountain shape in front view; and a left (right) side wall portion 131b formed by extending an outer surface of the protruding portion 131a to the vehicle front side. The left and right protruding portions 131a form a pair, and the left and right side wall portions 131b form a pair.

Each of the left and right protruding portions 131a is formed in a shape that extends from a position at the vehicle rear side of a front end of the trunk lid 11 to the vehicle front side and is continuous with the rear fender 10 to protrude toward the vehicle upper side.

Each of the left and right protruding portions 131a is formed in such a substantially mountain shape in front view that the width of the protruding portion 131a gradually increases from a vehicle upper end thereof toward a vehicle lower end thereof. In plan view, a vehicle rear side interval between the left and right protruding portions 131a in the vehicle width direction is wider than a vehicle front side interval between the left and right protruding portions 131a in the vehicle width direction.

In side view, a front end of the protruding portion 131a is formed in such an inclined shape that a vehicle lower end thereof is located at the vehicle rear side relative to a vehicle upper end thereof.

The side wall portion 131b is formed by extending a vehicle width direction outer surface of protruding portion 131a toward the vehicle front side to a position close to door glass 7a.

The cover base portion 132 has such a size as to cover a vehicle rear side portion of the storage compartment S and is formed in such a substantially flat plate shape that couples vehicle inner lower ends of the protruding portions 131a to each other in the vehicle width direction. The cover base portion 132 is formed in a shape that is a flat plane substantially continuous with an upper surface of the trunk lid 11.

The cover header portion 133 couples upper ends of the side wall portions 131b to each other in the vehicle width direction.

The rear window opening 134 is formed in an inverted trapezoidal shape in back view by front ends of the protruding portions 131a of the left and right cover side portions 131, a front end of the cover base portion 132, and a rear end of the cover header portion 133.

With this configuration, the deck cover 13 is formed in such a shape that a portion surrounded by the left and right protruding portions 131a tapers from the vehicle rear side toward the rear window opening 134.

An inside of the deck cover 13 is covered with a deck cover trim 135 serving as a design surface in the vehicle interior.

The vehicle 1 is configured such that an operation of opening the storage compartment S by the movement of the deck cover 13 toward the vehicle upper side and an operation of closing the storage compartment S by the movement of the deck cover 13 toward the vehicle lower side can be realized by a pair of left and right cover opening/closing mechanisms 20.

As shown in FIG. 3, the left (right) cover opening/closing mechanism 20 include: a left (right) front cover link member 21 and a left (right) rear cover link member 22 which support the deck cover 13; and a left (right) cover link driving portion 23 configured to rotate the front cover link member 21. The left and right front cover link members 21 form a pair, the left and right rear cover link members 22 form a pair, and the left and right cover link driving portions 23 form a pair.

Each of the front cover link members 21 is formed in a substantially band shape extending in the vehicle upward/downward direction in side view and includes: an upper end rotatably coupled to a front end of a cover bracket 136 provided at a lower portion of the deck cover 13; and a lower end coupled to the cover link driving portion 23.

Each of the rear cover link members 22 is formed in a substantially band shape extending in the vehicle upward/downward direction in side view and includes: an upper end rotatably coupled to the cover bracket 136 of the deck cover 13 at the vehicle rear side of the front cover link member 21; and a lower end rotatably coupled to the cover link driving portion 23.

Each of the cover link driving portions 23 is fastened and fixed to a fender inner panel 10a constituting a vehicle inside portion of the rear fender 10.

The cover link driving portion 23 includes: a large-diameter gear (not shown) to which the front cover link member 21 is coupled and which is rotatably supported by a shaft; a plurality of driving gear pairs (not shown) which mesh with the large-diameter gear and are rotatably supported by respective shafts; a housing accommodating and holding these components; an electric motor (not shown) configured to rotate the driving gear pairs; and the like.

Further, a lower end of the rear cover link member 22 is rotatably coupled to an upper rear end of the cover link driving portion 23. To be specific, the cover opening/closing mechanism 20 constitutes a four-joint link structure in which the front cover link member 21 serves as a driving link, and the rear cover link member 22 serves as a driven link.

As shown in FIGS. 1 to 3, the openable roof 6 has such a size as to cover the vehicle upper side of seats 15 on which the occupants are seated in the vehicle interior portion 8 and includes: a front roof 6a located at the vehicle front side; and a rear roof 6b located behind the front roof 6a. A front end of the front roof 6a is configured to be detachable from an upper portion of a front window 16.

As shown in FIG. 3, the rear window 14 includes: rear glass 14a having transparency; a rear window frame member 14b supporting the rear glass 14a; and a window sealing member 14c attached along an outer peripheral edge of the rear window frame member 14b. Further, a pair of left and right brackets 14d are attached and fixed to a front surface of the rear window frame member 14b so as to be lined up in the vehicle width direction. Below-described roof opening/closing mechanisms 30 are coupled to the respective left and right brackets 14d.

The vehicle 1 is configured such that the operation of storing the openable roof 6 and the rear window 14 in the storage compartment S and the operation of developing the stored openable roof 6 and the stored rear window 14 can be realized by a pair of left and right roof opening/closing mechanisms 30.

As shown in FIG. 3, the roof opening/closing mechanisms 30 include: a plurality of roof link members supporting the openable roof 6 and the rear window 14; and a pair of left and right roof link driving portions 31 configured to turn the plurality of roof link members.

The plurality of roof link members may be suitably configured as long as the roof link members can store the openable roof 6 and the rear window 14 in the storage compartment S. The present embodiment shows one example of the roof link members As one example, the plurality of roof link members include: a pair of left and right first roof links 32 coupling the rear roof 6b of the openable roof 6 and the roof link driving portions 31; a pair of left and right second roof links 33 coupling rear ends of the first roof links 32 and the rear window 14; and a pair of left and right third roof links (not shown) coupling front ends of the first roof links 32 and the front roof 6a of the openable roof 6.

Each of the first roof links 32 is a link member having a substantially T shape in side view and includes: a portion extending in the vehicle forward/rearward direction and fastened and fixed to a vehicle outer end portion of the rear roof 6b; and a portion extending in the vehicle upward/downward direction and including a lower end coupled to the roof link driving portion 31.

Each of the second roof links 33 is a link member having a substantially band shape in side view and includes: a front end rotatably coupled to a rear end of the first roof link 32; and a rear end rotatably coupled to the bracket 14d of the rear window 14.

Each of the third roof links includes: one end rotatably coupled to an upper portion of the first roof link 32; and the other end fastened and fixed to the front roof 6a.

Each of the roof link driving portions 31 is located at a vehicle inner side of the vehicle interior portion 8 and fastened and fixed to an upper portion of a front end of a pillar inner panel 17 by fastening bolts 34, the pillar inner panel 17 constituting an opening edge of the door 7. The roof link driving portion 31 is fixed to the pillar inner panel 17 such that a part thereof projects to the vehicle upper side of an upper end of a door main body 7b vertically movably supporting the door glass 7a.

The roof link driving portion 31 is configured such that a housing accommodates: a large-diameter gear (not shown) to which the first roof link 32 is coupled and which is rotatably supported by a shaft; a plurality of driving gear pairs (not shown) which mesh with the large-diameter gear and are rotatably supported by respective shafts; and the like.

Further, electric motors (not shown) configured to rotate the driving gear pairs are arranged at vehicle width direction outer sides of the housing.

The electric motors are controlled so as to drive the pair of left and right roof link driving portions 31 at the vehicle left side and the vehicle right side in sync with each other.

In addition, as shown in FIGS. 3 and 7, the roof link driving portion 31 includes a housing extended portion 35 formed by extending an upper end of a front portion of the housing at the vehicle width direction inner side toward the vehicle upper side. A pillar member 18 interposed between the door glass 7a and the deck cover 13 is fastened and fixed to the housing extended portion 35 by fastening bolts 36.

As shown in FIGS. 1, 3, and 7, the pillar member 18 is a columnar body extending along a rear end of the door glass 7a toward the vehicle upper side and is coupled to the pillar inner panel 17 through the roof link driving portion 31.

As shown in FIGS. 3 and 8, the pillar member 18 includes: a pillar core member 181 fastened and fixed to the housing extended portion 35; and a synthetic-rubber pillar sealing member 182 attached to the pillar core member 181 and configured to close a gap between the door glass 7a and the deck cover 13.

As shown in FIGS. 3 and 7, screw holes (not shown) and a fitting hole 181a are formed on the pillar core member 181. The fastening bolts 36 that fasten the housing extended portion 35 of the roof opening/closing mechanism 30 are threadedly engaged with the screw holes (not shown). The fitting hole 181a is located at the vehicle upper side of the screw holes, and a below-described metal clip 63 of the projecting trim 62 is fitted in the fitting hole 181a.

According to the vehicle 1 including the cover opening/closing mechanisms 20 and the roof opening/closing mechanisms 30, the deck cover 13 is moved to open the storage compartment S, and the openable roof 6 and the rear window 14 are displaced and folded to be stored in the storage compartment S.

Specifically, when the occupant inputs a command of storing the openable roof 6 and the rear window 14 in the storage compartment S, the cover link driving portions 23 of the cover opening/closing mechanisms 20 start turning the front cover link members 21 to a vehicle rear upper side. At this time, the rear cover link members 22 follows the front cover link members 21. With this, the cover opening/closing mechanisms 20 displace the deck cover 13 to the vehicle upper rear side substantially in parallel to open the storage compartment S.

Then, the roof link driving portions 31 of the roof opening/closing mechanisms 30 start turning the first roof links 32 to the vehicle rear side. At this time, the second roof links 33 and the third roof links start turning in conjunction with the turning of the first roof links 32.

The roof opening/closing mechanisms 30 turn the rear roof 6b to a vehicle front lower side such that a lower surface of the front roof 6a and a lower surface of the rear roof 6b are opposed to each other in the vehicle upward/downward direction. Further, the roof opening/closing mechanisms 30 turn the rear window 14 such that a front surface of the rear window 14 faces the vehicle upper side, and move the rear window 14 to a lower side of the folded rear roof 6b.

The roof opening/closing mechanisms 30 move the openable roof 6 and the rear window 14 to the storage compartment S while folding the openable roof 6 and the rear window 14 as above.

As shown in FIG. 2, as units configured to straighten the traveling wind flowing from the vehicle front side when the openable roof 6 and the rear window 14 are stored in the storage compartment S, the vehicle 1 includes: a pair of left and right front deflector devices 40 arranged at an upper portion of the front window 16; a rear deflector 50 arranged at the vehicle rear side of the seats 15; and a pair of left and right straightening trim bodies 60 arranged at respective side surfaces in the vehicle interior.

As shown in FIGS. 4 and 5, the front deflector devices 40 are arranged at respective positions on an upper portion of a front window frame member 16b supporting front glass 16a having transparency, the positions being located at a vehicle front side of the respective seats 15 on which the occupants are seated and being opposed to the respective seats 15.

When the openable roof 6 separates from the upper portion of the front window 16, deflector main bodies 41, which receive the traveling wind, of the front deflector devices 40 project from respective storage positions, shown by two-dot chain lines, to the vehicle upper side of the front window frame member 16b by biasing units incorporated in the respective deflector main bodies 41.

The front deflector devices 40 have a function of straightening the traveling wind flowing from the vehicle front side and causing the wind to flow to the vehicle rear side of the cover header portion 133 of the deck cover 13.

As shown in FIG. 2, the rear deflector 50 is arranged between the left and right seats 15 and at the vehicle rear side of the seats 15. The rear deflector 50 has a function of straightening turning wind flowing through the rear window opening 134 of the deck cover 13 into the vehicle interior and guiding the wind to vehicle width direction outer sides.

As shown in FIG. 6, the left (right) straightening trim body 60 includes: a left (right) side-surface trim 61 covering an upper portion of a front end of the pillar inner panel 17; and a left (right) projecting trim 62 located at the vehicle upper side of the side-surface trim 61 and covering a lower portion of the pillar member 18. The left and right side-surface trims 61 form a pair, and the left and right projecting trims 62 form a pair.

The side-surface trim 61 and the projecting trim 62 are formed in such shapes as to be able to straighten the traveling wind between a lower portion of a front end of the side wall portion 131b and the seat 15 toward the rear window opening 134, the traveling wind flowing inside through a door glass opening that is opened by lowering the door glass 7a.

Specifically, as shown in FIGS. 6 to 8, the side-surface trim 61 is formed so as to integrally cover a lateral side of the vehicle interior and a rear side of the seat 15 and be attachable to an upper portion of a lateral side of a back trim 70 separating the storage compartment S and the vehicle interior from each other. The side-surface trim 61 is formed so as to cover the roof opening/closing mechanism 30 and have such a shape that an upper end thereof projects to the vehicle upper side of an upper end of the door main body 7b.

The side-surface trim 61 includes a portion (hereinafter referred to as a "side-surface trim upper portion 61a") projecting to the vehicle upper side of the upper end of the door main body 7b to have such a shape that the traveling wind flowing inside through the door glass opening can be straightened toward the rear window opening 134.

More specifically, as shown in FIG. 7, the side-surface trim upper portion 61a is formed such that in a substantially vertical section along the vehicle width direction, a vehicle width direction inner surface thereof has a bent sectional shape that is convex toward a vehicle width direction outer side.

Further, as shown in FIGS. 6 and 7, the vehicle width direction inner surface of the side-surface trim upper portion 61*a* is formed in such a bent shape that in side view, a rear end thereof tapers toward the rear window opening 134 located at a vehicle rear upper side.

As shown in FIGS. 6 to 8, the projecting trim 62 is formed separately from the side-surface trim 61 and is formed to have such a length in the vehicle upward/downward direction that in side view, an upper end thereof is located at substantially the same position as a lower portion of a head rest portion of the seat 15.

As shown in FIG. 8, the projecting trim 62 is formed in such a shape as to integrally cover: a portion of the roof opening/closing mechanism 30 which portion projects to the vehicle upper side of the upper end of the door main body 7*b*; and the lower portion of the pillar member 18. A lower portion of the projecting trim 62 is fitted in the side-surface trim 61, and an upper portion of the projecting trim 62 is coupled to the fitting hole 181*a* of the pillar member 18 through the metal clip 63.

As shown in FIG. 7, the projecting trim 62 is formed such that in a substantially vertical section along the vehicle width direction, a vehicle width direction inner surface thereof has a bent sectional shape that is continuous with the side-surface trim upper portion 61*a* and convex toward a vehicle width direction outer side.

Further, as shown in FIGS. 8 and 9, the vehicle width direction inner surface of the projecting trim 62 is formed in such a sectional shape that in a substantially horizontal section, a rear end thereof is located at a vehicle width direction inner side of a front end thereof, and the vehicle width direction inner surface of the projecting trim 62 is substantially parallel to a virtual line (not shown) connecting the door glass opening (not shown), formed by lowering the door glass 7*a*, and a vehicle width direction outer side of the rear window opening 134.

Next, the flow of the traveling wind W flowing into the vehicle 1 through the door glass opening during the traveling of the vehicle 1 including the side-surface trim 61 and the projecting trim 62 will be explained in reference to FIG. 9.

As shown in FIG. 9, when the traveling wind W flowing through the vehicle lateral side toward the vehicle rear side flows through the vicinity of the door glass opening in a state where the openable roof 6 and the rear window 14 are stored in the storage compartment S, the flow direction of the traveling wind W is deflected by the negative pressure in the vehicle interior such that the traveling wind W is attracted to the vehicle interior while flowing toward the vehicle rear side.

The traveling wind W whose flow direction has been deflected flows into the vehicle interior along the pillar member 18 and then flows through a space between the cover side portion 131 and the seat 15, that is, the vicinity of a head of the occupant to flow to the vehicle rear side.

In this case, the side-surface trim upper portion 61*a* and the projecting trim 62 straighten the traveling wind W so as to guide the traveling wind W toward the rear window opening 134. Then, the traveling wind W straightened by the side-surface trim upper portion 61*a* and the projecting trim 62 flows through the rear window opening 134 toward the vehicle rear side to be discharged to the outside of the vehicle.

The trim structure of the vehicle 1 which realizes the above flow of the traveling wind W can straighten the traveling wind W flowing through the vehicle lateral side into the vehicle interior and reduce unpleasant feelings given to the occupant(s) by the traveling wind W.

Specifically, since the trim structure of the vehicle 1 includes the side-surface trim upper portion 61*a* and the projecting trim 62, the trim structure of the vehicle 1 can straighten the traveling wind W, flowing inside through the door glass opening, to guide the traveling wind W to the vehicle rear side. With this, the trim structure of the vehicle 1 can prevent, for example, a case where the traveling wind W flowing inside through the door glass opening flows toward the head of the occupant and a case where air turbulence is generated between the straightening trim body 60 and the head of the occupant.

Therefore, the trim structure of the vehicle 1 can suppress exposure to wind, that is, prevent the traveling wind W from hitting the occupant. Further, the trim structure of the vehicle 1 can realize that noise generated by the flow of the traveling wind W flowing through the vicinity of the head of the occupant, especially around ears of the occupant, is hardly transmitted to the occupant.

Further, since the trim structure of the vehicle 1 includes the rear window opening 134 located at the vehicle rear side of the seats 15, the trim structure of the vehicle 1 can smoothly discharge the traveling wind W, straightened by the side-surface trim upper portion 61*a* and the projecting trim 62, through the rear window opening 134 in the open state toward the vehicle rear side to the outside of the vehicle.

With this, the trim structure of the vehicle 1 can suppress the generation of the air turbulence by the traveling wind W at the vehicle rear side of the seats 15 and the generation of the noise by the air turbulence. To be specific, the trim structure of the vehicle 1 positively and efficiently discharges the traveling wind W, flowing through the door glass opening into the vehicle interior, through the rear window opening 134 to the outside of the vehicle. Thus, the trim structure of the vehicle 1 can reduce factors that give the unpleasant feelings to the occupant(s) during the discharging operation.

Therefore, by the side-surface trim upper portion 61*a*, the projecting trim 62, and the rear window opening 134, the trim structure of the vehicle 1 can straighten the traveling wind W flowing through the vehicle lateral side into the vehicle interior and reduce the unpleasant feelings given to the occupant(s) by the traveling wind W.

Since the upper portion of the projecting trim 62 is coupled to the pillar member 18, the trim structure of the vehicle 1 can more stably straighten the traveling wind W flowing through the vehicle lateral side into the vehicle interior and further reduce the factors that give the unpleasant feelings to the occupant(s).

Specifically, for example, when the side-surface trim 61 and the projecting trim 62 integrally form a straightening trim body, and the vehicle 1 does not include the pillar member 18, rigidity of a projecting portion of the straightening trim body tends to be low, so that the straightening trim body tends to swing by pressure of the traveling wind W flowing inside through the door glass opening.

Therefore, the straightening trim body cannot stably straighten the traveling wind W, flowing inside through the door glass opening, toward the rear window opening 134 and may cause the traveling wind W to flow toward the head of the occupant.

However, since the projecting trim 62 is coupled to the upper portion of the pillar member 18 coupled to the pillar inner panel 17, the trim structure of the vehicle 1 can improve supporting rigidity of the projecting trim 62.

With this, the rigidity of the projecting trim 62 of the trim structure of the vehicle 1 can be made higher than the rigidity of, for example, a projecting trim supported by the side-surface trim 61, and the trim structure of the vehicle 1 can suppress the swinging of the projecting trim 62 by the pressure of the traveling wind W.

Therefore, the trim structure of the vehicle 1 can more stably suppress a case where the traveling wind W flowing inside through the door glass opening flows toward the head of the occupant.

Further, since the swinging of the projecting trim 62 by the pressure of the wind can be suppressed, the trim structure of the vehicle 1 can suppress the generation of the noise by the swinging of the straightening trim body 60 when the traveling wind W is straightened by the straightening trim body 60.

Therefore, since the straightening trim body 60 is coupled to the pillar member 18 provided at the pillar inner panel 17, the trim structure of the vehicle 1 can more stably guide the traveling wind W, flowing through the vehicle lateral side into the vehicle interior, toward the rear window opening 134 and further reduce the factors that give the unpleasant feelings to the occupant(s).

Even when the deck cover 13 is configured such that the traveling wind W is hardly discharged to the outside of the vehicle through a portion other than the rear window opening 134, the trim structure of the vehicle 1 can reduce, by the side-surface trim upper portion 61a and the projecting trim 62, the factors that give the unpleasant feelings to the occupant(s).

Specifically, since the deck cover 13 is constituted by the left and right cover side portions 131, the cover header portion 133, and the cover base portion 132, the deck cover 13 can cover a portion between the seats 15 and the rear window opening 134 while securing a predetermined space.

In a case where the side-surface trim upper portions 61a and the projecting trims 62 are not included, a part of the traveling wind W flowing inside the deck cover 13 may flow so as to drift inside the deck cover 13 (for example, the traveling wind W flows convectively), and this may cause the air turbulence.

However, since the side-surface trim upper portion 61a and the projecting trim 62 are included, the traveling wind W flowing inside through the door glass opening can be guided to the rear window opening 134. Therefore, even in a case where the deck cover 13 covers a portion between the seats 15 and the rear window opening 134, the trim structure of the vehicle 1 can suppress the flow rate and flow velocity of the traveling wind W flowing inside the deck cover 13. With this, the trim structure of the vehicle 1 can suppress the generation of the air turbulence by the traveling wind W flowing inside the deck cover 13 and the generation of the noise by the air turbulence.

Further, even when the deck cover 13 is configured such that the traveling wind W is hardly discharged to the outside of the vehicle through a portion other than the rear window opening 134, the trim structure of the vehicle 1 can straighten the traveling wind W flowing inside through the door glass opening. Therefore, according to the trim structure of the vehicle 1, the deck covers 13 of various shapes can be configured, and the design of the vehicle 1 can be improved.

Therefore, even when the deck cover 13 is configured such that the traveling wind W is hardly discharged to the outside of the vehicle through a portion other than the rear window opening 134, the trim structure of the vehicle 1 can reduce, by the straightening trim body 60, the factors that give the unpleasant feelings to the occupant(s).

The openable roof 6 and the rear window 14 are stored in the storage compartment S located at the vehicle lower side of the deck cover 13, and the straightening trim body 60 is provided at the vehicle rear portion 12. With this, for example, even when the rear window 14 is opened or closed during traveling at low speed, the trim structure of the vehicle 1 can surely straighten the traveling wind W flowing through the vehicle lateral side into the vehicle interior and can stably reduce the factors that give the unpleasant feelings to the occupant(s).

Specifically, the trim structure of the vehicle 1 includes the straightening trim body 60 at the vehicle rear portion 12, so that even in a case where, for example, the deck cover 13 moves upward relative to the vehicle rear portion 12 to open or close the rear window 14 during traveling at low speed, the trim structure of the vehicle 1 can straighten the traveling wind W flowing inside through the door glass opening.

Further, the straightening trim body 60 is coupled to the pillar member 18, so that even when the turbulence of the flow of the traveling wind W is generated by the deck cover 13 that moves upward and downward, the trim structure of the vehicle 1 can surely straighten the traveling wind W by the straightening trim body 60 having high supporting rigidity.

Therefore, for example, even when the rear window 14 is opened or closed during traveling at low speed, the trim structure of the vehicle 1 can surely straighten the traveling wind W flowing through the vehicle lateral side into the vehicle interior and can stably reduce the factors that give the unpleasant feelings to the occupant(s).

Since the straightening trim body 60 is formed in such a shape as to cover the roof link driving portion 31, the trim structure of the vehicle 1 can effectively utilize a limited space in the vehicle interior and suppress the generation of the noise by collision of the traveling wind W with the roof link driving portion 31.

Specifically, the roof link driving portion 31 can be arranged so as to project to the vehicle upper side of the upper end of the door main body 7b. Therefore, the trim structure of the vehicle 1 can improve the degree of freedom of the layout of the roof link driving portion 31 as compared to a case where the roof link driving portion 31 is arranged at the pillar inner panel 17 so as not to project to the vehicle upper side of the upper end of the door main body 7b.

Further, since the straightening trim body 60 covers the roof link driving portion 31, the trim structure of the vehicle 1 can suppress the generation of the noise by the collision of the traveling wind W, flowing inside through the door glass opening, with the roof link driving portion 31 and the generation of the air turbulence.

Therefore, since the straightening trim body 60 covers the roof link driving portion 31 arranged so as to project to the vehicle upper side of the upper end of the door main body 7b, the trim structure of the vehicle 1 can effectively utilize a limited space in the vehicle interior and suppress the generation of the noise by the collision of the traveling wind W with the roof link driving portion 31.

Components of the present invention correspond to the components of the above embodiment as below. To be specific, a vehicle body of the present invention corresponds to the vehicle rear portion 12 and pillar inner panel 17 of the above embodiment. Similarly, a side portion of the vehicle body corresponds to the vehicle front portion 5. A rear roof corresponds to the deck cover 13. An upper side portion corresponds to the cover side portion 131. A rear opening portion corresponds to the rear window opening 134. A closing member corresponds to the rear window 14. A straightening trim corresponds to the side-surface trim upper portion 61a of the side-surface trim 61 and the projecting trim 62. A projecting portion corresponds to the pillar member 18. An upper coupling portion corresponds to the cover header portion 133. A lower coupling portion corresponds to the cover base portion 132. A predetermined auxiliary device corresponds to the roof link driving portion 31. However, the present invention is not limited to the components of the above embodiment, and various embodiments may be made.

For example, in the above embodiment, the deck cover 13 is configured to be openable and closable but is not limited to this and may be fixed to the vehicle rear portion 12.

The vehicle 1 includes a pair of left and right seats 15 but is not limited to this and may be a vehicle including rear seats located at the vehicle rear side of the pair of left and right seats 15.

The rear opening portion is the rear window opening 134 closed by the rear window 14 is but is not limited to this and may be, for example, a slit-shaped opening located close to the rear window 14 attached and fixed to the deck cover 13. Or, the rear opening portion may open by storing the openable roof 6 and a portion covering a portion extending from the rear end of the openable roof 6 to the trunk lid 11.

The straightening trim body 60 is configured to straighten the traveling wind W by the side-surface trim 61 and the projecting trim 62 but is not limited to this and may be formed in such a shape that the side-surface trim upper portion 61a of the side-surface trim 61 is extended to the vehicle upper side to be integrated with the projecting trim 62.

The pillar core member 181 is coupled to the pillar inner panel 17 through the roof opening/closing mechanism 30 but is not limited to this and may be directly fastened and fixed to the pillar inner panel 17 or may be integrated with the pillar inner panel 17.

The roof link driving portion 31 is covered with the straightening trim body 60 but is not limited to this. For example, a mechanism portion storing the openable roof 6 and a mechanism portion storing the rear window 14 may be configured separately, and any one of these mechanism portions may be covered with the straightening trim body 60. Or, for example, a seatbelt winding device fastened and fixed to the pillar member 18 may be used instead of the roof link driving portion 31.

LIST OF REFERENCE CHARACTERS 1 vehicle
5 vehicle front portion
7 door
7a door glass
7b door main body
12 vehicle rear portion
13 deck cover
14 rear window
15 seat
17 pillar inner panel
18 pillar member
31 roof link driving portion
61a side-surface trim upper portion
62 projecting trim
131 cover side portion
132 cover base portion
133 cover header portion
134 rear window opening
S storage compartment
W traveling wind

The invention claimed is:
1. A trim structure of a vehicle,
the trim structure comprising:
a door including
a door main body supported so as to be openable and closable relative to a side portion of a vehicle body of the vehicle and
a door glass supported by the door main body so as to be vertically movable; and
a rear roof constituting a vehicle interior upper portion located at a vehicle upper side of an upper end of the door main body and a vehicle rear side of the door main body, wherein:
the trim structure is provided between a seat located adjacent to the door main body and the rear roof and at the vehicle upper side of the upper end of the door main body;
the rear roof includes
a pair of left and right upper side portions opposed to each other in a vehicle width direction,
a rear opening portion located at a vehicle rear side of the seat and opening in a vehicle forward/rearward direction, and
a closing member configured to close the rear opening portion and be openable and closable;
the trim structure comprises a straightening trim located between a lower portion of a front end of one of the upper side portions and the seat and projecting to the vehicle upper side of the upper end of the door main body; and
the straightening trim is formed in such a shape as to straighten traveling wind to the rear opening portion in an open state, the traveling wind flowing through a vehicle lateral side into a vehicle interior with the door glass lowered.

2. The trim structure according to claim 1, further comprising a projecting portion including:
a lower portion coupled to a portion of the vehicle body which portion is located close to a rear end of the door main body; and
an upper portion projecting to the vehicle upper side of the upper end of the door main body, wherein
an upper portion of the straightening trim is coupled to the projecting portion.

3. The trim structure according to claim 2, wherein:
each of the pair of left and right upper side portions is formed in a shape having a predetermined length in the vehicle forward/rearward direction; and
the rear roof includes
an upper coupling portion coupling upper portions of the upper side portions to each other in the vehicle width direction and
a lower coupling portion coupling lower portions of the upper side portions to each other in the vehicle width direction.

4. The trim structure according to claim 3, wherein:
the closing member is constituted by a rear window configured to close the rear opening portion and be openable and closable;
the trim structure comprises a storage compartment storing at least the rear window, the storage compartment being located at a portion of the vehicle body which portion is located at a vehicle lower side of the rear roof;
the rear roof is configured to be supported by the vehicle body and cover the storage compartment so as to be openable and closable; and
the straightening trim is provided at the vehicle body.

5. The trim structure according to claim 4, further comprising a predetermined auxiliary device including:
a lower portion coupled to a portion of the vehicle body which portion is located close to a rear end of the door main body; and
an upper portion arranged so as to project to the vehicle upper side of the upper end of the door main body, wherein
the straightening trim is formed in such a shape as to cover the predetermined auxiliary device.

6. The trim structure according to claim 1, wherein:
each of the pair of left and right upper side portions is formed in a shape having a predetermined length in the vehicle forward/rearward direction; and
the rear roof includes
an upper coupling portion coupling upper portions of the upper side portions to each other in the vehicle width direction and
a lower coupling portion coupling lower portions of the upper side portions to each other in the vehicle width direction.

7. The trim structure according to claim 1, wherein:
the closing member is constituted by a rear window configured to close the rear opening portion and be openable and closable;
the trim structure comprises a storage compartment storing at least the rear window, the storage compartment being located at a portion of the vehicle body which portion is located at a vehicle lower side of the rear roof;
the rear roof is configured to be supported by the vehicle body and cover the storage compartment so as to be openable and closable; and
the straightening trim is provided at the vehicle body.

8. The trim structure according to claim 2, wherein:
the closing member is constituted by a rear window configured to close the rear opening portion and be openable and closable;
the trim structure comprises a storage compartment storing at least the rear window, the storage compartment being located at a portion of the vehicle body which portion is located at a vehicle lower side of the rear roof;
the rear roof is configured to be supported by the vehicle body and cover the storage compartment so as to be openable and closable; and
the straightening trim is provided at the vehicle body.

9. The trim structure according to claim 6, wherein:
the closing member is constituted by a rear window configured to close the rear opening portion and be openable and closable;
the trim structure comprises a storage compartment storing at least the rear window, the storage compartment being located at a portion of the vehicle body which portion is located at a vehicle lower side of the rear roof;
the rear roof is configured to be supported by the vehicle body and cover the storage compartment so as to be openable and closable; and
the straightening trim is provided at the vehicle body.

10. The trim structure according to claim 1, further comprising a predetermined auxiliary device including:
a lower portion coupled to a portion of the vehicle body which portion is located close to a rear end of the door main body; and
an upper portion arranged so as to project to the vehicle upper side of the upper end of the door main body, wherein
the straightening trim is formed in such a shape as to cover the predetermined auxiliary device.

11. The trim structure according to claim 2, further comprising a predetermined auxiliary device including:
a lower portion coupled to a portion of the vehicle body which portion is located close to a rear end of the door main body; and
an upper portion arranged so as to project to the vehicle upper side of the upper end of the door main body, wherein
the straightening trim is formed in such a shape as to cover the predetermined auxiliary device.

12. The trim structure according to claim 3, further comprising a predetermined auxiliary device including:
a lower portion coupled to a portion of the vehicle body which portion is located close to a rear end of the door main body; and
an upper portion arranged so as to project to the vehicle upper side of the upper end of the door main body, wherein
the straightening trim is formed in such a shape as to cover the predetermined auxiliary device.

13. The trim structure according to claim 6, further comprising a predetermined auxiliary device including:
a lower portion coupled to a portion of the vehicle body which portion is located close to a rear end of the door main body; and
an upper portion arranged so as to project to the vehicle upper side of the upper end of the door main body, wherein
the straightening trim is formed in such a shape as to cover the predetermined auxiliary device.

14. The trim structure according to claim 7, further comprising a predetermined auxiliary device including:
a lower portion coupled to a portion of the vehicle body which portion is located close to a rear end of the door main body; and
an upper portion arranged so as to project to the vehicle upper side of the upper end of the door main body, wherein
the straightening trim is formed in such a shape as to cover the predetermined auxiliary device.

15. The trim structure according to claim 8, further comprising a predetermined auxiliary device including:
a lower portion coupled to a portion of the vehicle body which portion is located close to a rear end of the door main body; and
an upper portion arranged so as to project to the vehicle upper side of the upper end of the door main body, wherein
the straightening trim is formed in such a shape as to cover the predetermined auxiliary device.

16. The trim structure according to claim 9, further comprising a predetermined auxiliary device including:
a lower portion coupled to a portion of the vehicle body which portion is located close to a rear end of the door main body; and an upper portion arranged so as to project to the vehicle upper side of the upper end of the door main body, wherein the straightening trim is formed in such a shape as to cover the predetermined auxiliary device.

\* \* \* \* \*